(12) United States Patent
Lucz et al.

(10) Patent No.: US 8,508,113 B2
(45) Date of Patent: Aug. 13, 2013

(54) HYBRID COMPACT FLUORESCENT LAMP FIXING METHOD

(75) Inventors: Peter Lucz, Budapest (HU); Qi Long, ShangHai (CN); Devin Sun, ShangHai (CN); Chunrong Huang, Xiamen (CN); Yunfei Zhu, Xiamen (CN)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 13/150,527

(22) Filed: Jun. 1, 2011

(65) Prior Publication Data
US 2012/0169200 A1    Jul. 5, 2012

(30) Foreign Application Priority Data
Dec. 31, 2010 (CN) .......................... 2010 1 0625201

(51) Int. Cl.
*H01J 5/48* (2006.01)
*H01J 5/50* (2006.01)
*F21V 33/00* (2006.01)

(52) U.S. Cl.
USPC ............... 313/317; 313/318.01; 313/318.12; 313/631; 313/634; 362/234; 362/236; 445/22; 445/23; 445/26; 445/27

(58) Field of Classification Search
USPC ...... 313/1, 631–643, 317–318.012; 362/234, 362/236; 445/22, 23, 26, 27
See application file for complete search history.

(56) References Cited

U.S. PATENT DOCUMENTS

| | | | | |
|---|---|---|---|---|
| 5,309,061 A | * | 5/1994 | Bouchard et al. | 315/47 |
| 5,491,385 A | * | 2/1996 | Nilssen | 315/178 |
| 5,595,438 A | * | 1/1997 | Burd | 362/228 |
| 6,400,104 B1 | * | 6/2002 | Ham | 362/222 |
| 6,583,542 B2 | * | 6/2003 | Nagano et al. | 313/318.01 |
| 7,543,957 B1 | * | 6/2009 | Balazs et al. | 362/264 |
| 7,862,200 B2 | * | 1/2011 | Custodis et al. | 362/217.06 |
| 2011/0187256 A1 | * | 8/2011 | Tyagi et al. | 313/1 |
| 2011/0234094 A1 | * | 9/2011 | Wursching et al. | 315/51 |

FOREIGN PATENT DOCUMENTS

| | | | |
|---|---|---|---|
| EP | 0732536 A2 | | 9/1996 |
| EP | 1883099 A2 | * | 1/2008 |
| JP | 61-188848 A | | 8/1986 |
| JP | 2000164174 A | * | 6/2000 |
| WO | 2009/087735 A1 | | 7/2009 |

OTHER PUBLICATIONS

PCT Search Report and Written Opinion dated Apr. 12, 2012 from corresponding Application No. PCT/US2011/064311.

* cited by examiner

*Primary Examiner* — Mariceli Santiago
(74) *Attorney, Agent, or Firm* — Fay Sharpe LLP

(57) ABSTRACT

The invention is directed to a lamp assembly, and particularly to a method of fixing a first light source and a second light source in a single lamp assembly. More specifically, the invention provides a lamp assembly and a mechanism for fixing at least two light sources therein, at least one of which is a compact fluorescent light source, an incandescent light source, or a halogen light source, and where the fixing mechanism used involves soldering the lead-in wires of the second light source to a printed circuit board of the lamp assembly, which is in operative connection with the lamp ballast.

18 Claims, 4 Drawing Sheets

HYBRID COMPACT FLUORESCENT LAMP FIXING METHOD

BACKGROUND OF THE DISCLOSURE

This disclosure is directed to a lamp assembly, and particularly to a method of fixing a first light source and a second light source in a single lamp assembly. More specifically, the invention provides a lamp assembly and a mechanism for fixing at least two light sources therein, at least one of which is a compact fluorescent light source, an incandescent light source, or a halogen light source.

Lamps have been introduced recently that address certain problems pertaining to run-up behavior of compact fluorescent lamps, i.e., reducing the time to full light associated with starting or igniting fluorescent lamps. By way of example only, long-life compact fluorescent lamps need approximately 0.5 to 1.5 seconds to preheat the cathodes or electrodes before starting. Before preheating is complete, there is no light emission from the lamp. Once the arc discharge is initiated, the CFL still requires an additional approximately 20 to 120 seconds or more to reach full light output.

One proposed solution combines two light sources in one unit or lamp assembly. More particularly, a compact fluorescent light source and a conventional incandescent or halogen light source are combined in a single lamp assembly. The term "hybrid CFL lamp" or "hybrid lamp" has been used to refer to such lamp assemblies. By way of example, this type of lamp may be configured such that an incandescent or halogen light source is positioned within the spiral or double-helix of a compact fluorescent light source. An advantage gained by such arrangement is the immediate light generated by the incandescent or halogen light source, providing instantaneous light emission, while the CFL lamp simultaneously undergoes its warm-up period, which may last from 0.5 to 120 seconds. An added benefit of this hybrid lamp configuration is the use of heat generated by the incandescent or halogen light source, which is centrally positioned within the configuration of the CFL discharge tube, to heat the discharge tube of the CFL more efficiently, i.e. the mercury dose is more quickly vaporized by the additional heat.

While the foregoing lamp configuration addresses concerns regarding reduced light emission during lamp warm-up, it nonetheless has experienced a disadvantage or drawback with regard to the method and manner of fixing two different light sources within a single lamp assembly. Problems are encountered due to the difference in operating temperature of the two different light sources, and the affect of the heat of operation on the components of the light sources. For example, because a conventional CFL lamp does not generate as high operating temperatures as an incandescent or halogen lamp, it is generally manufactured to include a plastic collar in that portion of the lamp where the light source joins the power source. The plastic conventionally employed has a lower rated heat tolerance, suitable for use with CFL lamps that generate less heat. The hybrid lamp design, however, pairs the lower operating temperature CFL with a higher operating temperature incandescent or halogen lamp, thus rendering the lower temperature rated plastic collar susceptible to degradation caused by exposure to such high heat. Even in those lamps of the hybrid design that include a mechanism to control the higher temperature light source once the CFL lamp is sufficiently energized, such as a thermal sensor or switching mechanism for example, the heat generated by the instantaneous light source still deleteriously affects the plastic collar of the CFL lamp.

Attempts have been made to address this problem. For example, one means of controlling the heat generated by the instant start-up lamp in the hybrid configuration is to leave the lamp bare, i.e. not to use a lamp envelope or bulb to enclose the two light sources. This however is not as aesthetically pleasing as a lamp including an envelope or bulb, and a certain amount of the heat that is dissipated away from the instant start-up lamp in this type of bare arrangement that could be used to heat the CFL discharge tube is lost.

Other attempts to address the issues created by high temperature heat transfer to a low temperature rated plastic support or collar include the use of heat insulator structures, such as ceramics, cement, glue, and other materials that may be used to fix the fixtures in the desired configuration and absorb some of the heat generated during the initial start-up of operation. These measures, however, can prove costly, and are cumbersome during lamp manufacture.

There remains a need, therefore, for a method suitable for use with hybrid lamp designs for fixing two different types of light sources within a single lamp assembly, as well as for reducing degradation of low temperature rated lamp components caused by exposure to high operating temperatures of another light source housed within the same lamp assembly.

SUMMARY OF THE DISCLOSURE

A lamp assembly of the present disclosure includes a first light source and a second light source, both disposed within a single lamp assembly, and a fixing mechanism that fixes the light sources in a predetermined compact configuration with respect to one another. The lamp assembly may, in some embodiments, include an outer envelope or bulb that encloses the first and second light sources of the lamp assembly.

There is also provided a method for forming a hybrid lamp assembly including providing a lamp base having disposed therein a power source, disposing a first light source and a second light source in electrical connection with the power source in the base, providing a fixing mechanism, and fixing the position of the first and second light sources in a compact configuration with respect to one another using the fixing mechanism.

An embodiment of the lamp assembly includes a fluorescent light source and a halogen light source fixed in predetermined position with respect to one another. An envelope forms a cavity around at least the fluorescent and incandescent light sources. A fixing mechanism by which the fluorescent and halogen light sources are fixed in a predetermined position with respect to one another comprises solder used to fix the lead-in wires of the halogen light source to a printed circuit board included as part of the assembly in a position substantially centrally located to the legs of the fluorescent light source.

In another embodiment a method of fixing at least a first and second light source in a lamp assembly includes providing a first light source and a second light source, the light sources geometrically configured such that the second light source fits within a space created by the geometric shape of the first light source, and the lead in wires of both light sources extend through a plastic holder having a printed circuit board on one side thereof, and soldering the lead-in wires of the second light source to the printed circuit board to fix the position of the second light source with respect to the position of the first light source.

In one embodiment, the method includes providing a fluorescent light source as the first light source and a halogen or incandescent light source as the second light source, and disposing the second light source adjacent the first light source, such that the light emitting chamber of the first light source substantially surrounds the light emitting chamber of the second light source.

In still another embodiment, the lamp assembly includes the first light source and the second light source disposed adjacent one another, such that one of the light sources is substantially surrounded by the remaining light source. More particularly, in one embodiment the first light source is a spiral or double-helix CFL light source, and the second light source is a single tube halogen light source and is disposed within the spiral or double helix of the CFL discharge tube, and both light sources are fixed within a single lamp assembly by a plastic holder and by soldering the lead-in wires of the halogen light source to the printed circuit board such that the halogen light source is positioned substantially centrally within the spiral or double helix of the CFL.

A method of assembling a lamp assembly includes providing a lamp base, mounting a first light source to the base, positioning a second light source adjacent the first light source, fixing the first light source and the second light source in a predetermined compact configuration by fixing the position of the first light source using a plastic holder through which the legs of the first light source extend toward the base and by fixing the position of the second light source by extending the lead-in wires thereof through the plastic holder and a printed circuit board in contact with the underside of the plastic holder and soldering the lead-in wires of the second light source to the printed circuit board, and connecting the first light source and the second light source to a power control module disposed in the lamp base for selectively terminating power to one of the light sources in response to a predetermined temperature of the remaining light source.

In another embodiment, the method includes employing a spiral or double helix fluorescent light source as the first light source. A halogen light source is employed as the second light source. The light sources are fixed in a predetermined position with respect to one another using solder to fix the lead-in wires of the halogen light source to a printed circuit board disposed in the base of the lamp assembly housing the light sources.

A primary benefit of the present disclosure is the ability to fix two different light sources in a single lamp assembly in a manner such that the higher operating temperature of one light source does not deleteriously affect a component of the other light source during start up or operation.

Another benefit is associated with a simple construction that is easy to manufacture and is low cost.

Still other benefits and advantages of the present disclosure will become apparent upon reading and understanding the following detailed description.

DETAILED DESCRIPTION OF THE PREFERRED EMBODIMENTS

The invention is directed to a lamp assembly, and particularly to a method of fixing a first light source and a second light source in a single lamp assembly. More specifically, the invention provides a lamp assembly and a mechanism for fixing at least two light sources therein, at least one of which is a compact fluorescent light source, an incandescent light source, or a halogen light source, and where the fixing mechanism used involves soldering the lead-in wires of the second light source to the underside of the printed circuit board of the lamp assembly, which is in direct contact with the lamp ballast.

While the following description of various embodiments of the invention are provided with reference to the inclusion of a compact fluorescent light source and a halogen light source in the lamp assembly, as the first and second light sources, respectively, it is to be understood that either light source may be replaced by another suitable light source. For example, the halogen light source may be replaced by an incandescent light source or an LED light source. As such, the following disclosure and teaching with respect to the use of a halogen light source is equally applicable to the use of an incandescent, LED, or other light source.

Similarly, while the compact fluorescent light source is disclosed herein with reference to a spiral or double helix discharge tube configuration, other suitable configurations of the discharge tube may also benefit from the teaching herein. For example, CFL light sources having one or more U-shaped discharge tubes and known as multi-finger CFL light sources, and more particularly, for example, as quad-, hex-, and octo-multi-fingered light sources, may also be used herein. As such, the following disclosure and teaching with respect to the use of spiral or double-helix CFL light source is equally applicable to any configuration of a CFL discharge tube having legs that require or would benefit from being fixedly secured with respect to a second light source positioned within the same lamp assembly.

Figure 1:
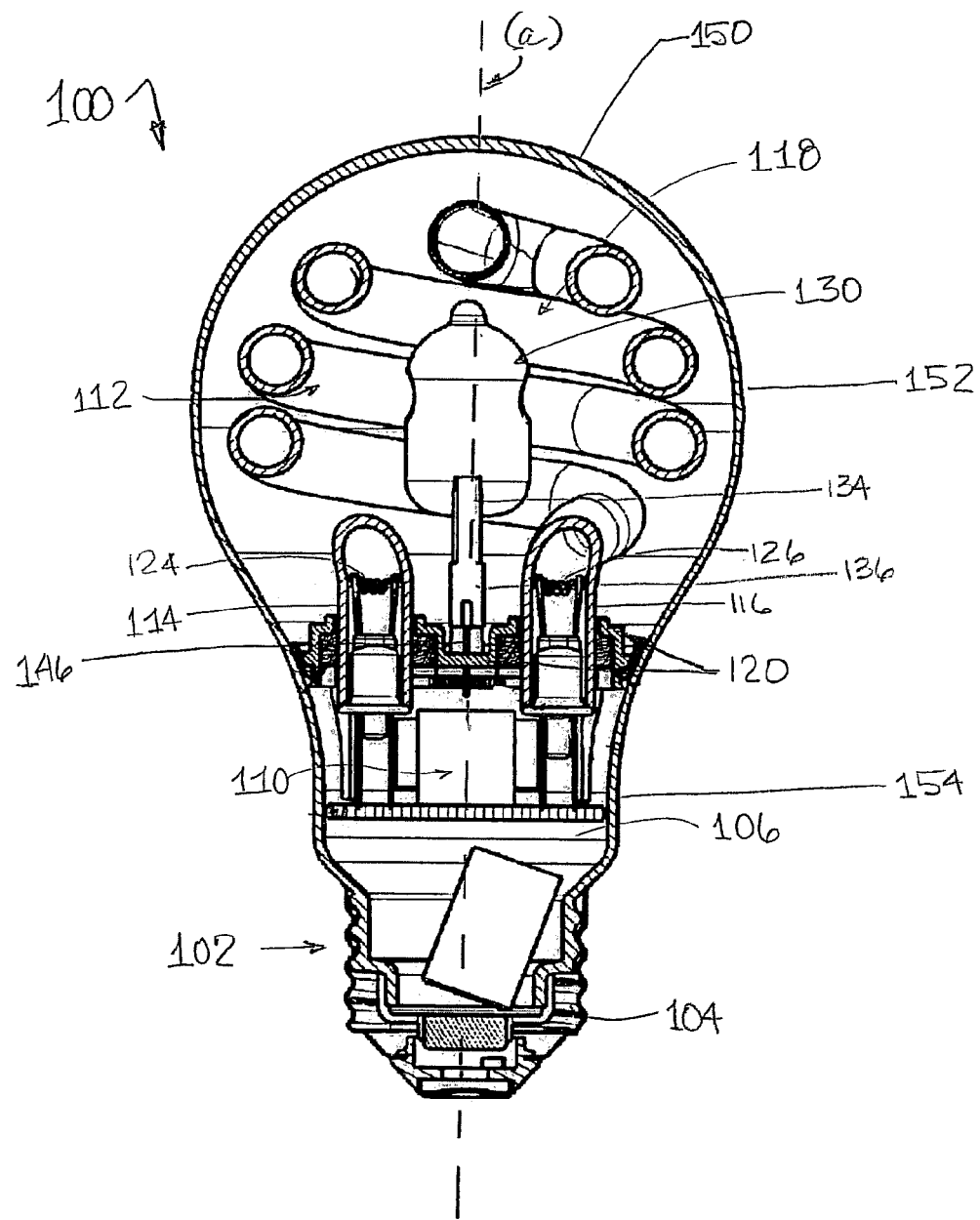
FIG. 1 is a cross-sectional elevation of a lamp assembly in accord with an embodiment of the invention.
Figure 2:
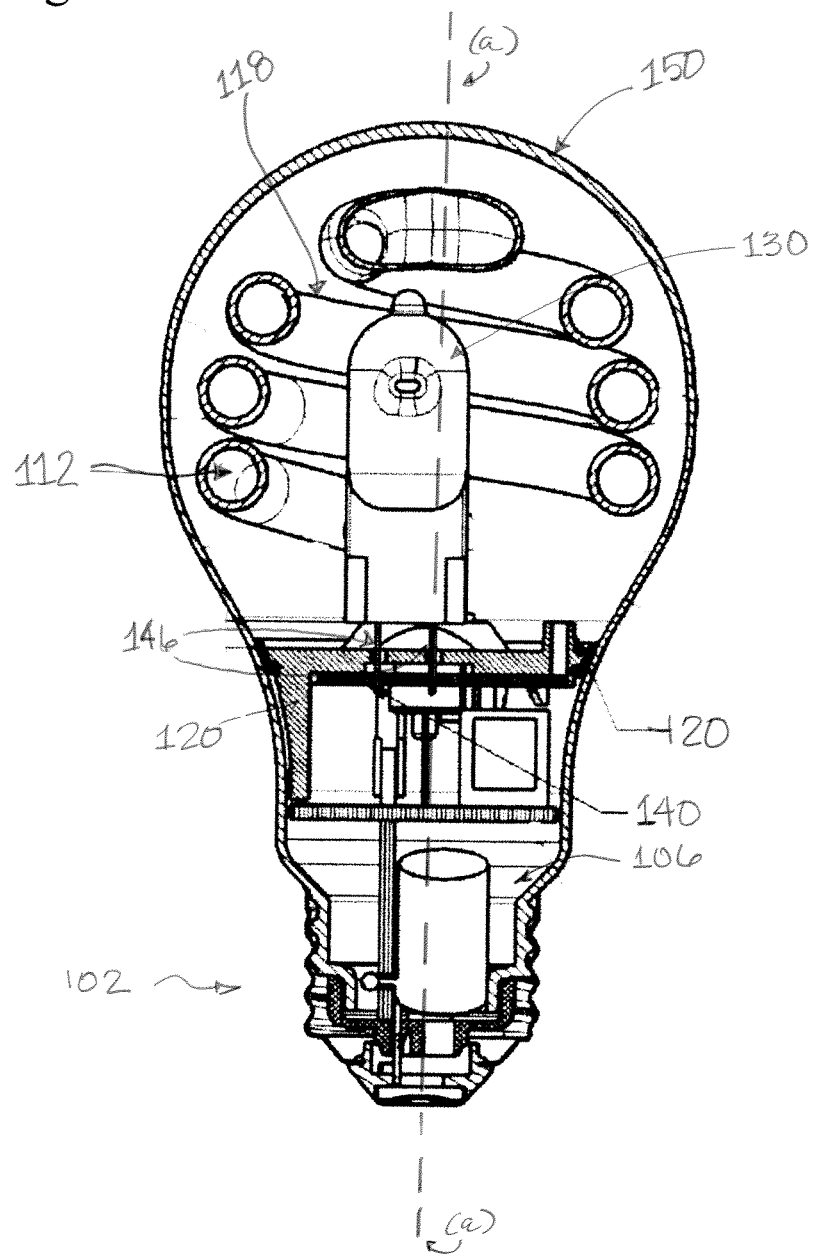
FIG. 2 is a cross-sectional elevation of a lamp assembly in accord with another embodiment of the invention.
Figure 3:
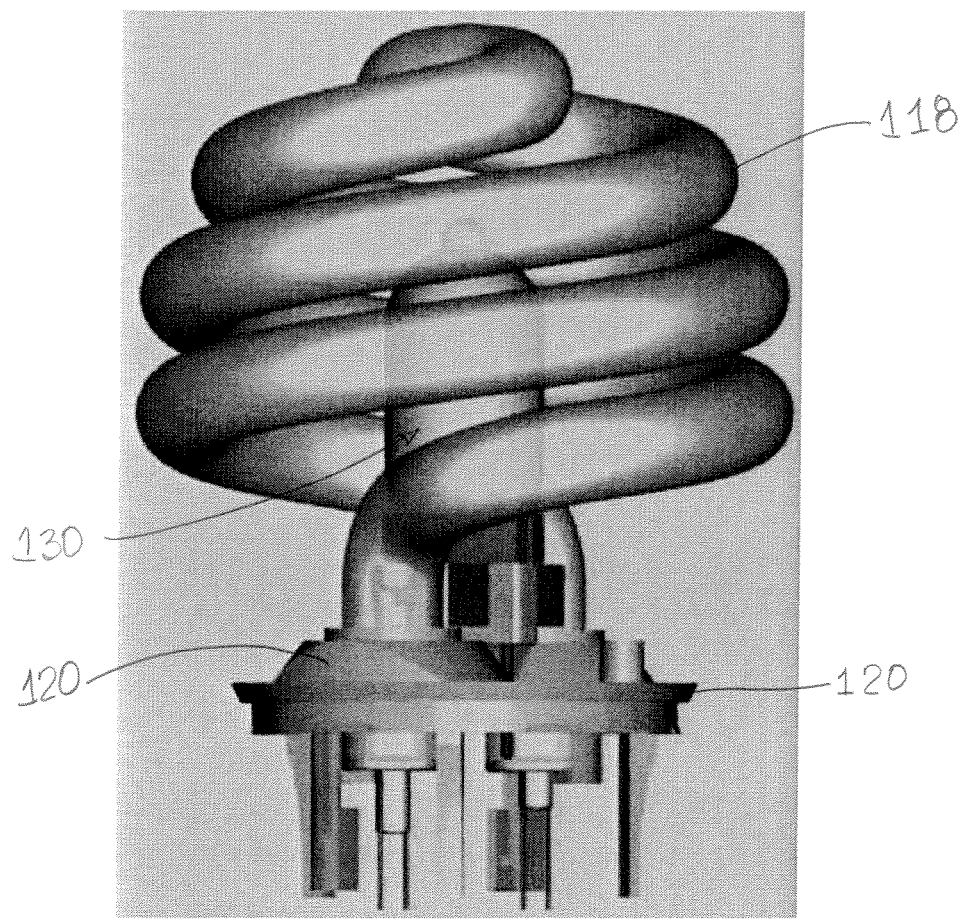
FIG. 3 is an elevation view, not in cross-section, of a lamp assembly in accord with FIG. 1.
Figure 4:
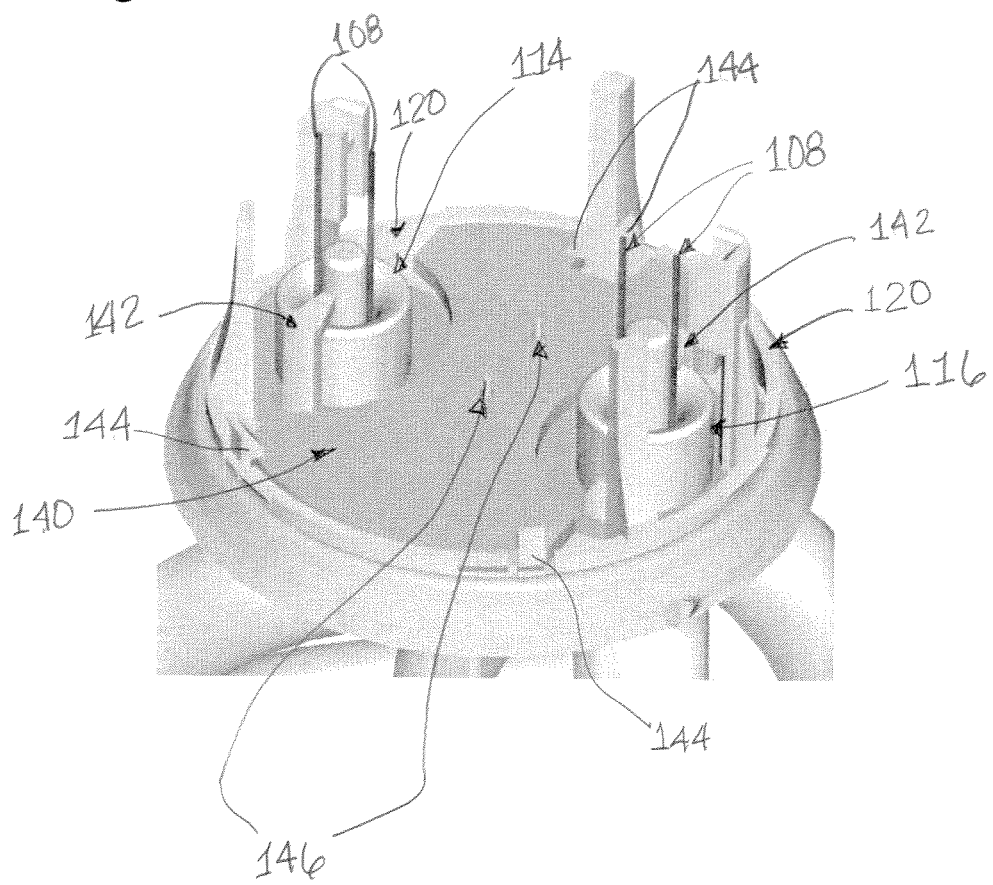
FIG. 4 is an enlarged view of the bottom or underside of the plastic holder of an assembly in accord with an embodiment of the invention.

FIG. 1 provides a cross-sectional elevation of a lamp assembly, and more particularly a compact fluorescent lamp assembly 100 that is generally referred to as an energy saving lamp or light source that advantageously provides instant light and fast warm-up. FIG. 2 provides a cross-sectional view of another embodiment of the invention. FIG. 3 sets forth an elevation of the lamp of FIG. 1, not in cross-section. FIG. 4 provides an enlarged view of that portion of the lamp assembly where the lead-in wires of the second light source penetrate the plastic holder and the printed circuit board, such that they may make electrical contact with the lamp ballast housed in the base of the assembly as shown in FIGS. 1 and 2. As such, in all Figures like numerical references are used to denote like features.

Now, with reference to FIGS. 1 and 2, and in less detail FIG. 3, there is provided a lamp assembly 100 including lamp base 102 housing a mechanical and electrical arrangement for receipt in an associated lamp socket (not shown) to mechanically support the lamp assembly 100 and provide power to operate the lamp assembly. More particularly, and without need to be limiting, a conventional Edison-base 102 is shown that includes a conductive, threaded metal shell 104 for threaded receipt in an associated lamp socket, and typically includes an electrical eyelet or second contact (not shown) spaced from the threaded shell 104 by insulating material at the lower end of the lamp assembly. This arrangement conventionally provides a two lead arrangement for establishing electrical contact associated with the lamp socket in a manner generally known in the art.

At least a portion of the lamp base, above and extending into the threaded shell 104 forms a compartment or inner cavity 106 that receives a power control module, such as ballast 110, including first and second light source ballasts, which allows an AC source to drive the lamp sources or light emitting components of the lamp assembly 100. Mounted to the lamp base is a first, for example a fluorescent, light source 112. The illustrated fluorescent light source has a spiral configuration or double-helix arrangement that includes first and second legs 114, 116 positioned in holder 120, legs 114, 116, having lower portions that extend in substantially parallel relation to a longitudinal axis (a) of the lamp assembly. The legs may be cylindrical in shape. The legs terminate and are disposed in the base 102 adjacent the power control module or ballast in order to provide ease of connection. Intermediate the first and second legs 114, 116, a remainder of discharge tube 118 adopts a generally spiral configuration of the compact fluorescent light source. A fill gas is sealed within the discharge tube, and electrodes or cathodes 124, 126 are provided in the respective legs 114, 116, and thus located at opposite ends of an elongated discharge path that extends through the length of the spiral discharge tube. As is known in the art, an arc is initiated between the cathodes and light emitted from the ionized fill is emitted as visible light in a desired color by passing through a phosphor provided on an inner surface of the discharge tube. It is understood that the first light source, if it is a compact fluorescent light source, may have a number of other configurations, as is stated above.

A second, for example halogen, light source 130, or an incandescent or tungsten halogen light source having a filament (not shown), is electrically connected to lamp ballast 110 by lead-in wires 108. In another preferred arrangement, the second light source is a tungsten halogen lamp. As illustrated in FIG. 1, the second light source 130 is a single ended source that is substantially centrally located within a hollow interior region formed within the spiral portion of the CFL 112. Particularly, the pinch portion of the second light source 130, having lower pinch portion 136 and upper pinch portion 134 that is closer to light source 130, is received in plastic holder 120. Holder 120 positions legs 114, 116 of the first light source, and receives lead-in wires 146 of the second light source. Holder 120 also separates the compartment of the lamp base that houses the power control module from the light emitting portions of the first and second light sources 112, 130. The light sources are also preferably housed or enclosed within a common envelope or outer bulb 150. The bulb is dimensioned to enclose the first source 112 and the second source 130 within its hollowed, generally spherical portion 152 and the bulb has a reduced dimension as it proceeds for sealed engagement with the lamp base along a necked-down region 154.

FIG. 2 provides a cross-sectional view of a lamp assembly in accord with another embodiment hereof, wherein the second light source 130 is slightly offset from center, shown by longitudinal axis a, due to the geometric configuration of the first light source 112. Given that the second source may be in some instances offset, the term "substantially centrally located" is used herein to refer to any relationship of the two light sources, so long as one is disposed adjacent or within the configuration of the other. FIG. 2 further provides a better view of the plastic holder 120. In this embodiment, printed circuit board 140 is shown adjacent to the lower side of plastic holder 120.

FIG. 3 provides a an external view of an embodiment of the invention showing only those portions of the lamp visible from the outside, and showing reference numerals in keeping with the foregoing Figures.

With reference now to FIG. 4, there is provided an enlarged view of the fixing mechanism according to an embodiment of the invention viewed from the bottom. First light source legs 114, 116 which house the lead-in wires 108 of the first light source are shown. Legs 114, 116 are held in position by plastic holder 120 which circumvents the interior surface of the lamp envelope 150 in necked down portion 154 (see FIG. 1). Holder 120 includes finger portions 122 which extend parallel to each leg of the first light source and then bend over the edge thereof to secure the legs, and as such the first light source, in the plastic holder 120. Further, printed circuit board 140 is positioned perpendicular to the longitudinal axis of the lamp assembly, and is secured within the perimeter of and adjacent to holder 120, which in this embodiment includes snap-in connections 144 to retain the printed circuit board in place. However, it is to be understood that printed circuit board 140 may be retained in place by any means, mechanical or otherwise, known to those skilled in the art, and as such is not intended to be a limiting feature of the invention. Extending through printed circuit board 140, substantially in the center thereof, are second light source lead-in wires 146. These lead-in wires are soldered to printed circuit board 140, fixing the second light source in position with respect to the first light source. As will be noticed, in this embodiment lead-in wires 146 are slightly off-set, consistent with the configuration shown in FIG. 2. However, they may be more centrally located, for example in keeping with the configuration shown in FIG. 1, or otherwise as dictated by the positioning of the light sources with respect to one another.

In an alternative embodiment, not shown, lead-in wires 146 may extend further through printed circuit board 140 and may instead be soldered to the ballast. In this latter arrangement, however, the lamp assembly may be less sturdy and more susceptible to loosening of the positions of the light sources with respect to one another.

In either configuration, soldering of the lead-in wires helps to stabilize position of the second light source with respect to that of the first light source. For example, it may be desirable to position the second light source as close to the holder a possible, and thus locate the second light source such that it is shielded only by the legs of the first light source, thereby allowing a greater amount of light to be emitted. In the alternative, the second light source may be positioned higher, away from the holder and more completely shielded by the discharge tube of the first light source. It is understood that in positioning the halogen light source within, for example, the spiral tube of a CFL light source, sufficient distance must be retained between the exterior of the halogen tube and the exterior of the CFL tube. In addition, placement of the second light source is generally determined, using the current fixing mechanism, to ensure that high operating temperature or heat generated by the second light source is remote enough from the plastic holder so as not to deleteriously affect the same. For example, in a lamp assembly in accord with the embodiment shown in FIGS. 1 and 2, the halogen capsule may be situated about 2 mm from the plastic holder and about 2.5 mm to about 8.3 mm below the top spirals of the CFL tube.

In one embodiment, the first light source is a CFL light source, and the second light source is a halogen light source. The halogen light source 130 provides an instant light type of light source when power is switched on to the lamp assembly 100. Moreover, the halogen light source heats up both the mercury reservoir and the entire discharge vessel of the energy saving type of light source or compact fluorescent light source 112. The heat from the halogen light source results in a faster evaporation of the mercury from the mercury reservoir into the discharge vessel. Thus, upon switching on the lamp assembly, power is provided to both of the light sources, and the halogen light source 130 provides instant light and also provides desired heat to warm-up the fluorescent lamp source 112. Once the fluorescent lamp source is ignited, the heat also aids in the faster evaporation of the mercury and reduces the run-up time to a full light or steady state operation of the fluorescent lamp source 112. This heat may, however, adversely affect plastic holder 120, causing degradation or deformation thereof. As set forth above, by soldering the second light source to the printed circuit board, this problem is addressed, ensuring that plastic holder 120 is sufficiently spaced from heat generated by the halogen light source to reduce any negative effects.

Both light sources are preferably located within the common outer bulb 150. This allows the arrangement to achieve the shortest warm-up period by reducing the loss of heat to the external environment. However, the first and second light sources may also be positioned within the lamp assembly as defined above, without a common outer bulb 150, or in a bare lamp arrangement.

The disclosure has been described with respect to preferred embodiments. Obviously, modifications and alterations may be contemplated by one skilled in the art, and the subject disclosure should not be limited to the particular examples described above but instead through the following claims.

What is claimed is:

1. A lamp assembly comprising:
   a lamp base housing a ballast for establishing an electrical connection to an external power source;
   a printed circuit board in operative connection with the lamp ballast,
   a first light source having two or more legs housing lead-in wires, the legs positioned for electrical connection to the lamp ballast by a plastic holder; and
   a second light source positioned adjacent the first light source by a fixing mechanism with lead-in wires of the second light source penetrating through the plastic holder and through the printed circuit board adjacent the plastic holder such that the lead-in wires of the second light source are electrically connected to the printed circuit board and the second light source is held and positioned by the lead wires thereof;
   wherein the fixing mechanism secures the first and second light sources in a predetermined compact configuration relative to one another, and spaces the second light source from the plastic holder such that heat generated by the second light source does not adversely affect the integrity of the plastic holder.

2. The lamp assembly of claim 1 further including an envelope forming a cavity around at least the first and second light sources.

3. The lamp assembly of claim 1 wherein the first light source is a compact fluorescent light source.

4. The lamp assembly of claim 3 wherein the compact fluorescent light source has a discharge tube having a spiral or double helix configuration, the tube terminating at each end in said legs, the legs being positioned substantially parallel to the longitudinal axis of the lamp assembly.

5. The lamp assembly of claim 3 wherein the compact fluorescent light source has a multi-finger configuration.

6. The lamp assembly of claim 1 wherein the plastic holder is formed from a low temperature rated plastic.

7. The lamp assembly of claim 4 wherein the second light source is a halogen light source and is substantially surrounded within the lamp assembly by the first light source.

8. The lamp assembly of claim 1 wherein the fixing mechanism is solder applied to the lead-in wires of the second light source adjacent and in contact with a surface of the printed circuit board.

9. The lamp assembly of claim 7 wherein the fixing mechanism is solder applied to the lead-in wires of the second light source adjacent and in contact with the printed circuit board.

10. The lamp assembly of claim 1 wherein the electrical connection of the lead-in wires of the second light source with the printed circuit board include a soldered interconnection.

11. The lamp assembly of claim 1 wherein central axes of the first and second light sources are offset relative to one another.

12. A method for providing a lamp assembly comprising:
    providing a lamp base;
    mounting a first light source within the lamp base, the first light source having two or more legs housing lead-in wires, the legs secured by a plastic holder, and descending in parallel relation to the longitudinal axis of the lamp assembly into the lamp base;
    positioning a second light source adjacent the first light source, with lead-in wires of the second light source penetrating through the plastic holder and through a printed circuit board adjacent the plastic holder; and
    fixing the first light source and the second light source in a predetermined compact configuration by soldering the lead-in wires of the second light source to the printed circuit board such that the second light source is spaced from the first light source and the plastic holder.

13. The method of claim 12 wherein the second light source is positioned in substantially the center of the lamp assembly, such that the lead-in wires penetrate substantially the center of the printed circuit board.

14. The method of claim 12 further including the step of providing an envelope that encases the first and second light sources.

15. The method of claim 12 wherein the first light source is a compact fluorescent light source and the second light source is a halogen light source.

16. The method of claim 15 wherein a light emitting portion of the compact fluorescent light source substantially surrounds a light emitting portion of the second light source.

17. The method of claim 12 wherein the plastic holder comprises low temperature rated material and the second light source emits heat of operation above the low temperature rating of the plastic holder material.

18. The method of claim 12 further comprising establishing an electrical connection between an external power source and each of the first light source and the second light source through the lamp base.

\* \* \* \* \*